Sept. 14, 1937.  J. S. ABERCROMBIE  2,092,793
RELIEF VALVE
Filed July 8, 1933

JAMES S. ABERCROMBIE
INVENTOR.
BY Jesse R. Stone
Lester B. Clark
ATTORNEYS.

Patented Sept. 14, 1937

2,092,793

UNITED STATES PATENT OFFICE 2,092,793

RELIEF VALVE

James S. Abercrombie, Houston, Tex., assignor to Abercrombie Pump Co., Houston, Tex., a corporation of Texas Application July 8, 1933, Serial No. 679,469

6 Claims. (Cl. 137—53)

The invention relates to an improvement in shearing relief valves particularly adapted for high pressure locations where it is desired to cushion the shock of opening of the valve.

It is one of the objects of the invention to provide a shear relief valve wherein the valve will release when a predetermined pressure is exerted thereon and wherein the fluid released by the valve is bypassed around the valve to serve as a cushion in bringing the valve to a position of rest.

Another object of the invention is to provide a cushioning arrangement for shear relief valves wherein a part of the fluid released by the valve is trapped in a chamber to serve as a cushion to absorb the shock of opening of the valve.

Another object of the invention is to provide an arrangement for shear relief valves wherein the location of the shear pin openings in both the housing and the valve stem can be readily determined by the position of the valve stem with respect to the housing.

Other and further objects of the invention will be readily apparent when the following description is considered in connection with the accompanying drawing wherein.

Figure 1:
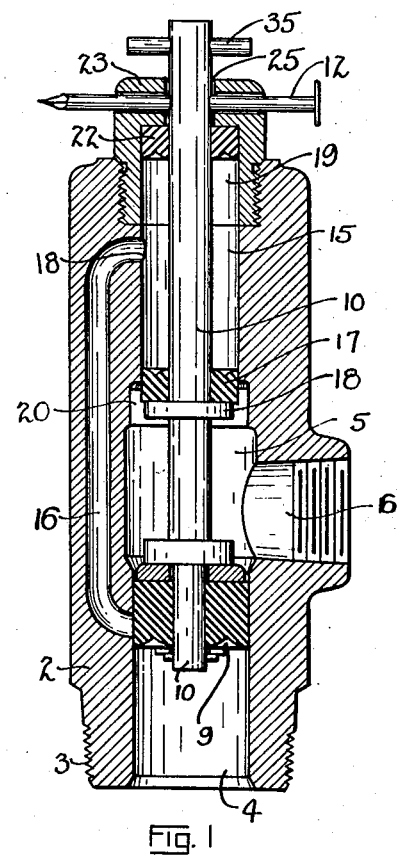
Fig. 1 is a central vertical section showing an arrangement of the housing and valve member and illustrating the bypass arrangement for cushioning the valve.

The present invention relates to somewhat the same subject matter as that disclosed in the prior copending application, Serial No. 588,280, filed January 23, 1932 by Herbert Allen.

The valve includes a housing 2 which may be made in any desired configuration, and is provided with a shank 3, which can be used to attach the valve to the line in which the pressure is to be relieved by shearing of the valve. The housing is provided with an entrance passage 4, the relief chamber 5, and the discharge passage 6. This passage 6 may be a continuation of the line to which the valve is connected, it may lead to the atmosphere, or it may have a back pressure exerted thereon because of any connection thereto.

The general arrangement of the valve member, including the packing 9, is similar to that disclosed in the prior Herbert Allen application, and is of the type where the valve stem 10 can move relative to the housing to a limited degree before the packing releases its sealing engagement with the housing. This is of advantage because if the packing is corroded or adheres to the housing and the valve stem is incapable of any movement, then the valve is unreliable because it will not shear at its designed pressure. With the present valve, however, when the predetermined pressure is exerted in the exposed area of the stem and the packing, the packing can yield, and shearing of the pin 12 will occur to completely release the stem 10. As the stem moves outwardly after shearing of the pin, then the packing 9 will be stripped from its adhering position and the desired relief will be obtained in the entrance passage.

The present design embodies a cushioning chamber 15 which is connected to the entrance chamber 4 through the bypass 16. This bypass enters the entrance passage 4 at a point such that it will be normally sealed by the packing member 9, so that there will be no escape of fluid from the passage 4 into the cushion chamber. When, however, the valve releases, the packing 9 will uncover the bypass 16 and there will be a rush of fluid into the cushion chamber 15. It is intended to take advantage of this cushioning action by providing a piston 17 on the stem 10 at such a location that the piston will be located in the cushion chamber 15. This piston 17 may be of the lip packing type with the lip facing into the cushion chamber 15 to prevent the escape of fluid from the cushion chamber into the relief chamber 5. A flange 18 on the stem supports this piston 17. It is intended that the bypass 16 will enter the cushion chamber 15 at a point 18, which is so located that when the valve has moved to open position the piston 17 will begin to cover this opening 18, so that a quantity of fluid will be trapped in the end 19 of the cushion chamber and bring the valve to a position of rest. The design of the piston 17 and the packing 9 with regard to the stem 10 is such that the piston may perform its cushioning action without interference of the packing member, because the packing member will move into the enlarged end 20 of the cushion chamber.

When the valve moves to release position, the pressure in the entrance passage 4 will, of course, accumulate in the cushion chamber 15. As the pressure in the entrance chamber is reduced because of the escape through the discharge passage 6, the pressure in the chamber 15 will be equalized because of the bypass 16. Thus the valve will move quickly to such a position that the pressure will escape through the discharge passage 6 and will then be gradually brought to a position of rest. As an emergency the cushion 22 is provided in the cap 23 so that if there is gas or vapor in the cushion chamber 15 in addition to some liquid, that the movement of the stem or valve will be cushioned.

Figure 2:
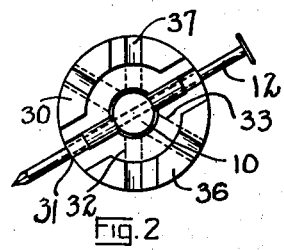
Fig. 2 is an end view of a form of the invention shown in Fig. 3.
Figure 3:
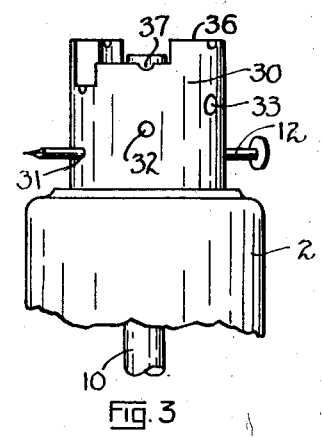
Fig. 3 is the side elevation of a cap arrangement which may be used with the valve of Fig. 1 which is particularly adapted to show when the shear pin opening in the stem is aligned with the corresponding opening in the cap or housing.

Figs. 2 and 3 show a modified form of arrangement of the shear pin 12. Fig. 3 shows a cap 30 which is a modified form of the cap 23. This cap 30 is provided with a plurality of transverse openings 31, 32 and 33. These openings may be of the same or different diameter, and are arranged to receive the shear pin 12. The stem 10 is provided with an opening 25 to receive the pin 12. When the stem is positioned inside of the cap, however, as the valve is normally closed, the precise location of the opening 25 is unknown. It is sometimes difficult to bring the passage 25 in the stem and the passage in the cap into alignment, so that the shear pin may be inserted. To this end, the stem 10 has been provided with the cross pin 35 and the cap 30 has been provided with a stepped end 36. Each of the steps is recessed at 37 in order to receive the pin 35. The pin 35 is inserted in the stem 10 on a diameter parallel to the opening 25. Thus when the pin 35 is moved into the desired step and the pin deposited in the recess in that step, then the operator is assured that the passage 25 is aligned with the corresponding passage in the cap, so that the shear pin may be quickly inserted.

This is of advantage because if the fluid escaping from the line is of value, it is necessary to replace the valve and prevent an excessive escape of liquid as soon as the pressure has been reduced to the desired value. With this in mind it is only necessary to grasp the pin 35, move it into the desired step, and insert a new shear pin 12. The openings 31, 32 and 33 are shown of different diameter in order that shear pins of different strength may be used.

What is claimed is:

1. A shear relief valve including a housing, a valve member therein adapted to normally close said housing, shear means to release said valve member, a bypass around said valve member adapted to be uncovered just prior to the release of the pressure fluid by the valve, and means operable against the fluid bypassing said valve member upon its release to resist full opening of said valve member.

2. A shear relief valve including a housing, a valve member, having a stem, a plurality of alignable openings in said stem and housing whereby shear pins of different sizes may be inserted, and means on said housing and stem adapted to indicate when said stem is aligned to receive a shear pin.

3. In a shear relief valve a housing, a valve stem projecting from said housing, shear pins adapted to be passed through openings in said stem and housing, a stepped end on said housing, and means on said stem adapted to engage said stepped end to indicate that the openings in said stem and housing are in alignment to receive the shear pin.

4. A shear relief valve including a housing, a valve member therein to normally close said housing, shear means to release said valve member, a bypass around said valve member which is normally covered thereby, a cushion chamber behind said valve and into which said bypass discharges, and means movable in said chamber upon movement of said valve member to be cushioned by the fluid bypassing the valve member after the bypass is uncovered as the valve member begins its opening movement.

5. A shear relief valve including a housing, a valve member therein to normally close said housing, shear means to release said valve member, a bypass around said valve member which is normally covered thereby, a cushion chamber behind said valve and into which said bypass discharges, and means movable in said chamber upon movement of said valve member to be cushioned by the fluid bypassing the valve member after the bypass is uncovered as the valve member begins its opening movement, the inlet of said bypass being positioned to be uncovered before the pressure is released by the opening of the valve member.

6. A shear relief valve including a housing, a sealing chamber, a discharge chamber and a cushion chamber arranged in said housing, a bypass from said sealing chamber to said cushion chamber around said discharge chamber, a valve stem extending through said chambers, shear means on said housing to release said stem, a sealing member on said stem in said sealing chamber and covering the inlet of said bypass, cushion means on said stem in said cushion chamber, said sealing means being movable on release of said shear means before the pressure is released into said discharge chamber whereby fluid will flow through said bypass to said cushion chamber.

JAMES S. ABERCROMBIE.